(12) United States Patent
Chen et al.

(10) Patent No.: US 10,272,557 B2
(45) Date of Patent: Apr. 30, 2019

(54) POWER TOOL

(71) Applicant: CHERVON (HK) LIMITED, Wanchai (HK)

(72) Inventors: Liang Chen, Nanjing (CN); Wu Chen, Nanjing (CN)

(73) Assignee: CHERVON (HK) LIMITED, Wanchai (HK)

( * ) Notice: Subject to any disclaimer, the term of this patent is extended or adjusted under 35 U.S.C. 154(b) by 354 days.

(21) Appl. No.: 15/221,816

(22) Filed: Jul. 28, 2016

(65) Prior Publication Data

US 2017/0028543 A1 Feb. 2, 2017

(30) Foreign Application Priority Data

Jul. 31, 2015 (CN) .......................... 2015 1 0466011

(51) Int. Cl.
| | |
|---|---|
| *B25F 3/00* | (2006.01) |
| *B23B 45/02* | (2006.01) |
| *B25B 21/00* | (2006.01) |

(52) U.S. Cl.
CPC ............... *B25F 3/00* (2013.01); *B23B 45/02* (2013.01); *B25B 21/00* (2013.01)

(58) Field of Classification Search
CPC ......... B25F 3/00; B23B 45/003; B23B 45/02; B25B 21/00
USPC ........ 173/1, 2, 130, 164, 176, 179, 183, 217
See application file for complete search history.

(56) References Cited

U.S. PATENT DOCUMENTS

| | | | | |
|---|---|---|---|---|
| 3,484,114 | A * | 12/1969 | Rodin | B25B 21/007 279/144 |
| 4,541,160 | A * | 9/1985 | Roberts | F16C 1/02 29/401.1 |
| 4,962,681 | A * | 10/1990 | Yang | B25B 21/00 408/20 |
| 4,989,323 | A * | 2/1991 | Casper | A01D 34/902 30/276 |
| 5,595,099 | A * | 1/1997 | Pusateri | B25B 21/02 279/97 |
| 5,951,026 | A * | 9/1999 | Harman, Jr. | B23Q 3/12 279/143 |
| 6,634,439 | B2 * | 10/2003 | Driessen | B25F 3/00 173/170 |
| 6,675,911 | B2 * | 1/2004 | Driessen | B25F 3/00 173/171 |
| 7,021,399 | B2 * | 4/2006 | Driessen | B25F 3/00 173/216 |
| 8,132,990 | B2 * | 3/2012 | Bauman | B23B 31/008 408/239 R |

(Continued)

*Primary Examiner* — Robert Long
(74) *Attorney, Agent, or Firm* — Greenberg Traurig, LLP (57) ABSTRACT

A power tool for driving a screwdriver bit and a drill bit. The power tool may include a tool device and a clamping device. The tool device may include a motor, a tool housing for receiving the motor, an outputting shaft forming an insertion hole for being inserted by the screwdriver bit, and a driving shaft configured to drive the outputting shaft to rotate about a center axis and forming an insertion socket. The clamping device may include a clamping head configured to clamp the drill bit, a connector for connecting the clamping head with the tool device detachably, and a transmitting member configured to pass through the insertion hole and insert into the insertion socket so that the driving shaft drives the clamping head rotate.

7 Claims, 9 Drawing Sheets

(56) References Cited

U.S. PATENT DOCUMENTS

| | | | | |
|---|---|---|---|---|
| 2004/0074344 | A1* | 4/2004 | Carroll | B25B 13/06 81/121.1 |
| 2006/0163824 | A1* | 7/2006 | Sasaki | B23B 31/1071 279/75 |
| 2006/0257220 | A1* | 11/2006 | Gertner | B23B 49/005 408/202 |
| 2007/0290458 | A1* | 12/2007 | Chuang | B25F 3/00 279/143 |
| 2011/0056714 | A1* | 3/2011 | Eiger | B25B 21/02 173/93.5 |
| 2012/0255749 | A1* | 10/2012 | Seith | B25B 13/06 173/1 |
| 2012/0325509 | A1* | 12/2012 | Puzio | B25B 21/02 173/90 |
| 2013/0277923 | A1* | 10/2013 | Campbell | B23B 31/123 279/126 |
| 2014/0346744 | A1* | 11/2014 | Herr | B25F 3/00 279/144 |
| 2015/0090471 | A1* | 4/2015 | Tao | B23B 31/36 173/216 |
| 2018/0214958 | A1* | 8/2018 | Sergyeyenko | B23B 31/06 |

* cited by examiner

POWER TOOL

This application claims the benefit of CN 201510466011.3, filed on Jul. 31, 2015, the disclosure of which is incorporated herein by reference in its entirety.

FIELD OF THE DISCLOSURE

The present disclosure relates generally to a power tool and, more particularly, to an electric power tool used to output a torque.

BACKGROUND OF THE DISCLOSURE

As known, when a user wants to screw something together, the user needs to use a drill to drill a screw hole first and then the user needs to use a screw driver to screw a bolt into the screw hole. It is a common problem that it is very inefficient for the user to frequently switch between use of the drill and the screw driver.

Present drills are provided with a chuck which is configured to grip a drill bit and which is also configured to grip and drive a screwdriver bit which has a cylindrical shank. However, this chuck cannot grip a screwdriver bit with a hexagonal shank.

The statements in this section merely provide background information related to the present disclosure and may not constitute prior art.

SUMMARY

In one aspect of the disclosure, a power tool for driving a screwdriver bit and a drill bit is provided, the power tool may include a tool device and a clamping device.

The tool device may include a motor, a tool housing for receiving the motor, an outputting shaft forming an insertion hole for being inserted into by the screwdriver bit, and a driving shaft configured to drive the outputting shaft to rotate about a center axis and forming an insertion socket.

The clamping device may include a clamping head configured to clamp the drill bit, a connector for connecting the clamping head with the tool device detachably, and a transmitting member configured to pass through the insertion hole and insert into the insertion socket so that the driving shaft drives the clamping head rotate.

Furthermore, the clamping head may rotate about the center axis.

Furthermore, the connector may be configured to slidably connect to the tool housing along a direction which is parallel to the center axis.

Furthermore, the tool device may include an operating member for being operated by a operator to control the current of the motor and an activating member movably connected to the tool housing and operable to activate the operating member at a first position and deactivate the operating member at a second position.

Furthermore, the clamping device may further comprise a pressing portion configured to press the activating member to the first position when the clamping device is connected to the tool device.

Furthermore, the pressing portion and the connector may be formed as one piece.

Furthermore, the tool device may include a biasing member configured to bias the activating member to the second position.

Furthermore, the tool device may include a switch member configured to be triggered by the activating member and enable the operating member to control the motor.

Furthermore, the tool housing may include a locking portion and the clamping device may comprises a locking member configured to engage the locking portion so as to lock the connector and the tool housing together.

Furthermore, the clamping device may include a spring member configured to bias the locking member to engage the locking portion when the connector is coupled to the tool housing.

Further areas of applicability will become apparent from the description provided herein. It should be understood that the description and specific examples are intended for purposes of illustration only and are not intended to limit the scope of the present disclosure.

DETAILED DESCRIPTION

The following description of the preferred embodiments is merely exemplary in nature and is in no way intended to limit the scope of the invention claimed, its application, or uses.

Figure 1:
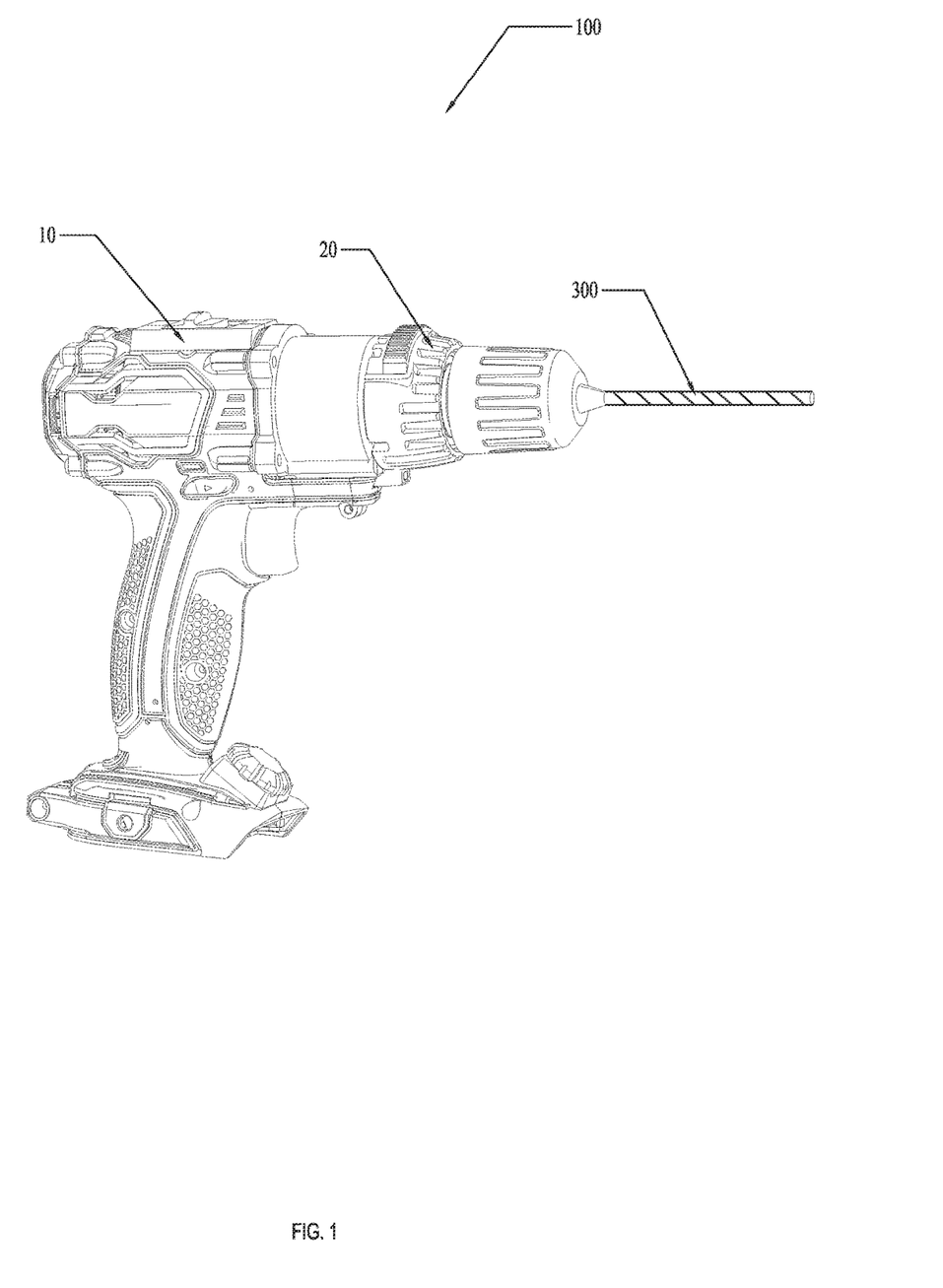
FIG. 1 is a schematic view of an exemplary power tool.
Figure 2:
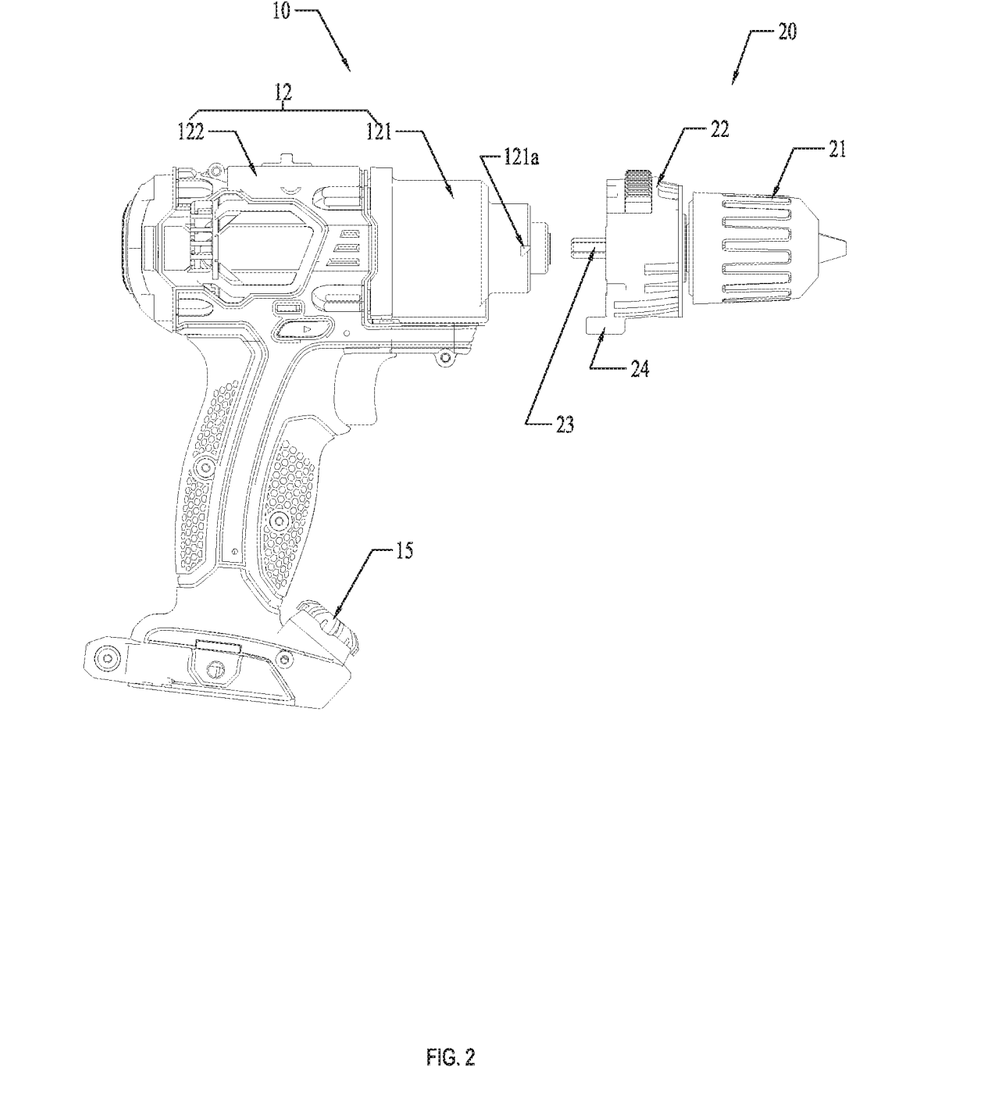
FIG. 2 is a schematic view of the power tool of FIG. 1 when the clamping device is uncoupled from the tool device.
Figure 3:
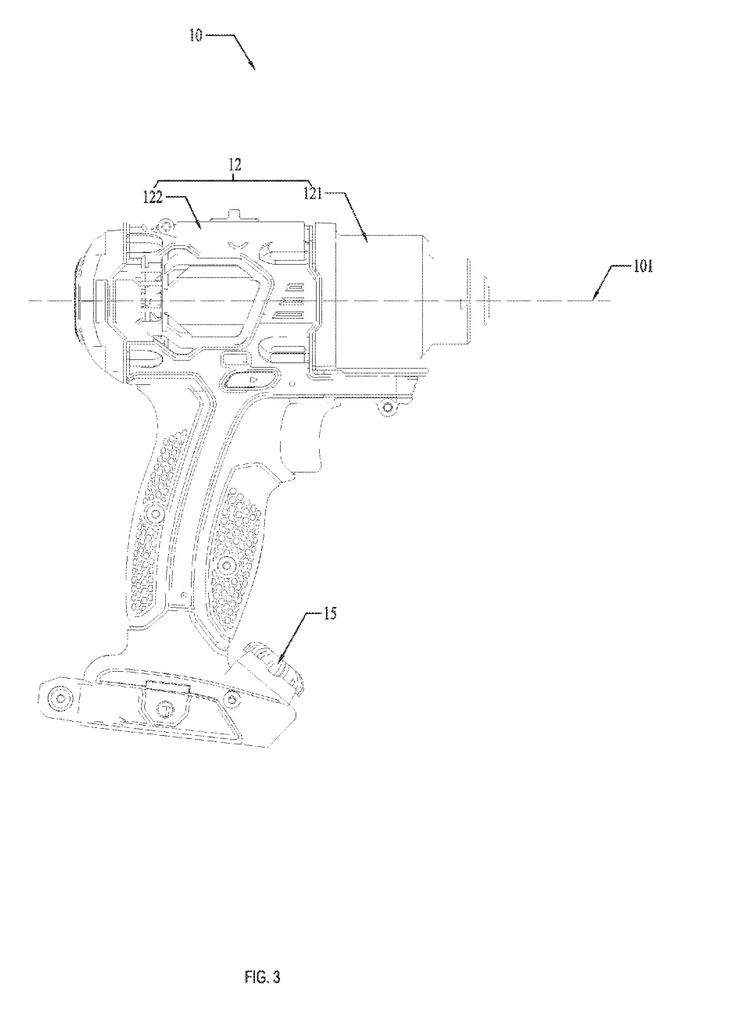
FIG. 3 is a schematic view of the tool device of FIG. 1.

As shown in FIG. 1, a power tool 100 is provided to drive a drill bit 300.

Figure 6:
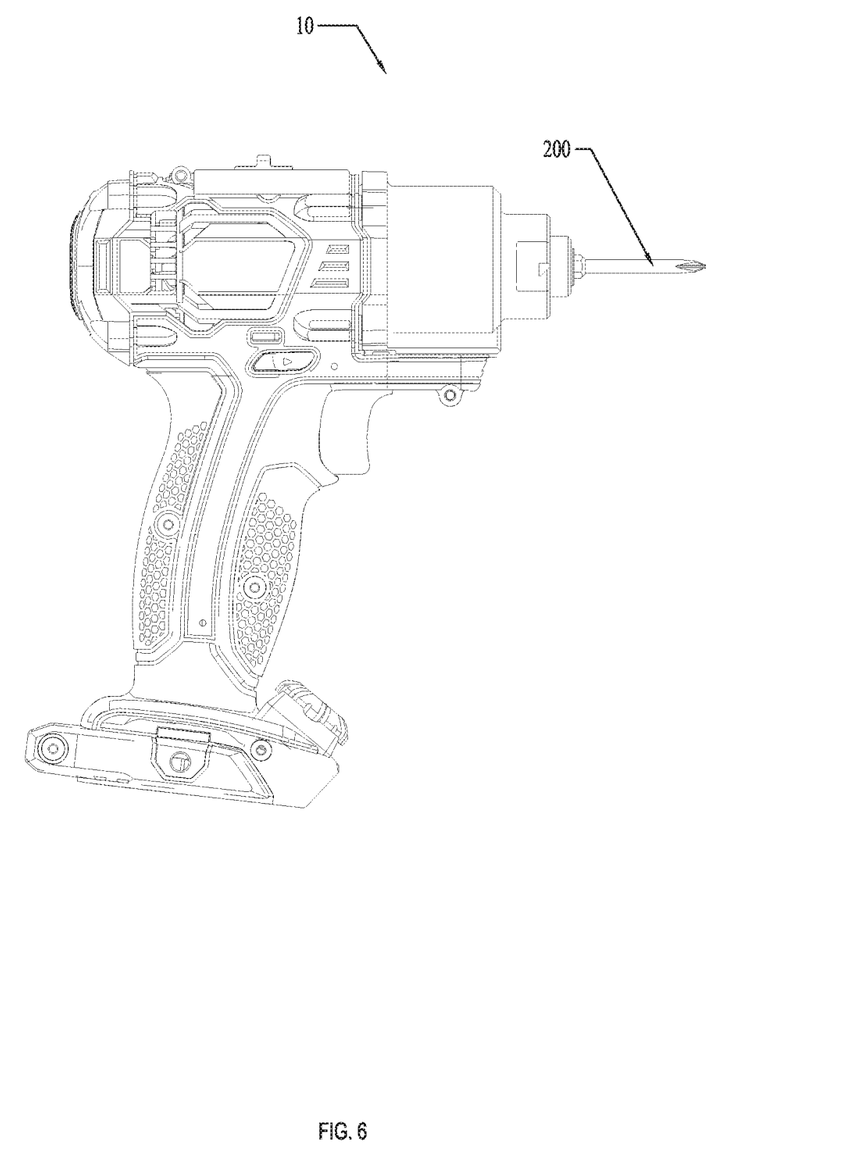
FIG. 6 is a schematic view of the tool device of FIG. 1 with a screwdriver bit.
Figure 7:
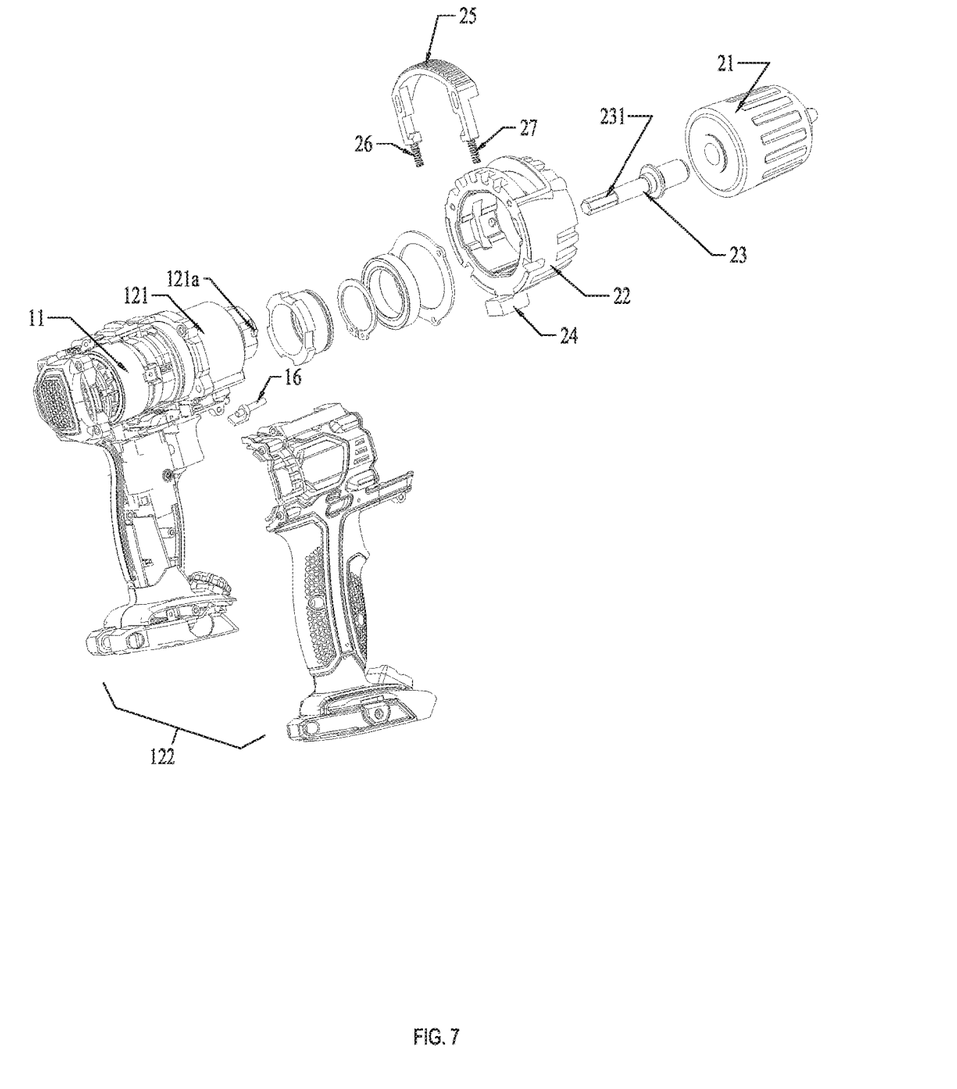
FIG. 7 is an exploded view of the power tool of FIG. 1.

As shown in FIGS. 1-9, the power tool 100 may include a tool device 10 and a clamping device 20. As shown in FIG. 6, the tool device is provided to drive a screwdriver bit 200.

The tool device 10 is used as an electronic screwdriver, the tool device 10 may include a motor 11, a tool housing 12, an outputting shaft 13 and a driving shaft 14.

The motor 11 is used to transform other forms of energy from a power supply such as a battery pack to mechanical power. The motor 11 may be an electromotor.

The tool housing 12 is configured to accommodate the motor 11 and other electronic components.

The outputting shaft 13 is rotatably connected to the tool housing 12, and the driving shaft 14 is capable of driving the outputting shaft 13 to rotate about a center axis 101. The outputting shaft 13 is configured to drive a screwdriver bit 200 into a screw hole. The outputting shaft 13 may form an insertion hole 131 which is configured to be inserted into by the screwdriver bit 200.

The insertion hole 131 is structured as a hexagonal hole so as to receive screwdriver bits with hexagonal shaped shanks.

Additionally, the tool device 10 may further include a sleeve 132, a coil spring 133, and two balls 134, 135. The sleeve 132 is slidably disposed on the outputting shaft 13, and the outputting shaft 13 forms two slots to receive the balls 134, 135, respectively. The slots run through the wall of the insertion hole 131 along the radial direction of the outputting shaft 13, the coil spring 133 is disposed on the outputting shaft 13 and is configured to bias the sleeve 132 to press the balls 134, 135 to engage with a groove of the screwdriver bit 200 by passing through the slot partly.

The driving shaft 14 is rotatably connected to the tool housing 12 and is configured to be driven by the motor 11. When the motor 11 drives the driving shaft 14 to rotate, the driving shaft is capable to driving the outputting shaft 13 to rotate synchronously with the outputting shaft 13 about the center axis 101.

For driving the clamping device 20 when the clamp device 20 is connected to the tool device 10, the driving shaft 14 forms an insertion socket 141, and the insertion socket 141 is arranged at the inner end of the insertion hole 131 and has an open end which is connected to the insertion hole 131.

As shown as FIG. 6, the tool device 10 can be used as a screw driver independently.

The clamping device 20 may include a clamping head 21, a connector 22, and a transmitting member 23.

The clamping head 21 is used to clamp a screwdriver bit 200. The connector 22 is configured to connect the clamping head 21 to the tool device 10 detachably, and the transmitting member 23 may be structured as a shaft and has two opposite ends, one of the two opposite ends is fixedly connected to the clamping head 21 and the other one of the two opposite ends is configured to form a transmitting portion 231 for inserting into the insertion socket 141 by passing through the insertion hole 131.

When the transmitting portion 231 is inserted into the insertion socket 141, the outer surface of the transmitting portion 231 engages with the wall of the insertion socket 141, so when the driving shaft 14 rotates, the transmitting member 23 and the clamping head 21 are driven to rotate synchronously with the driving shaft 14 about the centre axis 101 so as to drive the screwdriver bit 200 rotate.

The size in radial direction of the insertion hole 131 is greater than the size in radial direction of the insertion socket 141, specifically, the insertion socket 141 may be a hexagonal shaped socket.

The connector 22 may be structured as a sleeve which has a center through hole to sleeve on a part of the tool housing 12, and the connector 22 can be slidably connected to the tool housing 12 along a direction which is parallel to the center axis 101.

The tool housing 12 may include a first housing 121 to support the outputting shaft 13 and a second housing 122 which is configured to form a handle 122 to be griped by a user.

Figure 8:
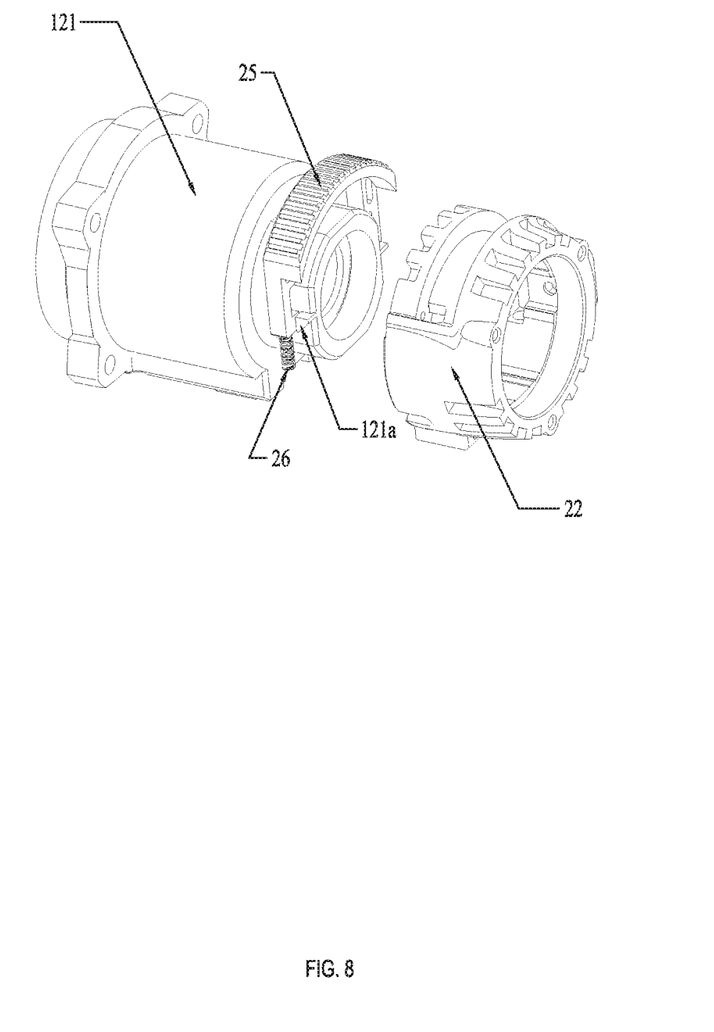
FIG. 8 is a detailed view of a part of the power tool of FIG. 1.
Figure 9:
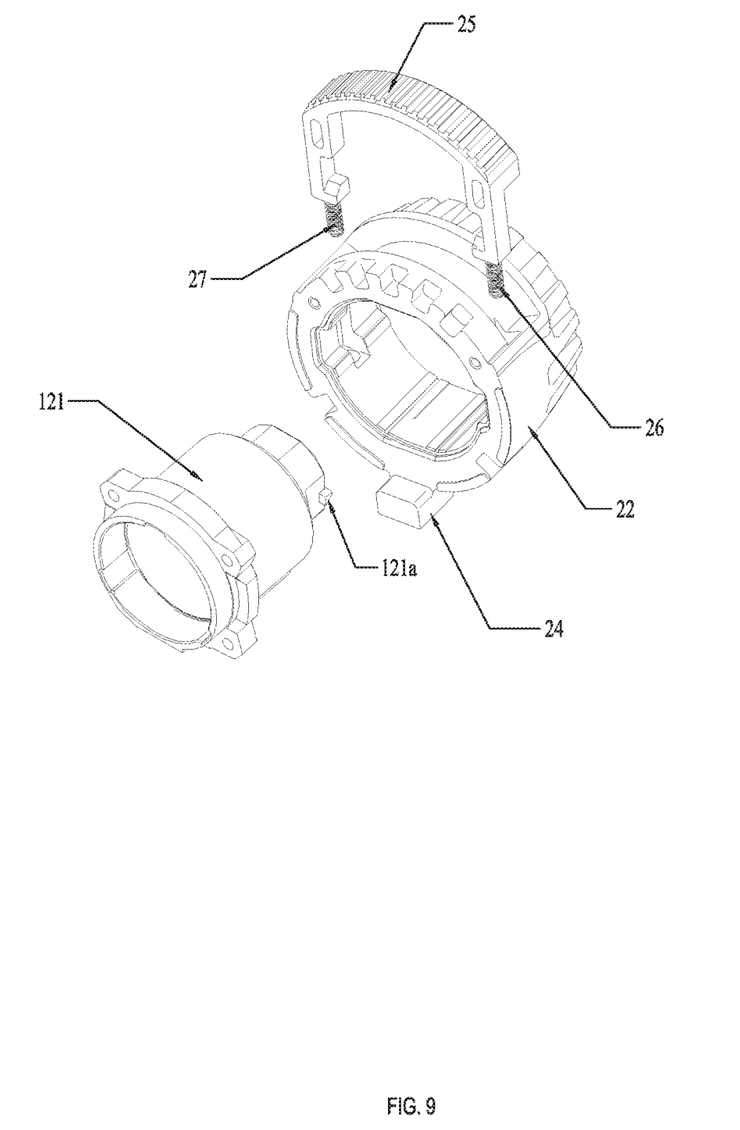
FIG. 9 is another detailed view of the part as shown is FIG. 8 in another state.

The connector 22 is coupled to the first housing 121, and the first housing 121 may form a locking portion 121a. The clamping device 20 may further include a locking member 25 that is slidably connected to the connector 22 in a direction perpendicular to the center axis 101 and is configured to engage with the locking portion 121a. When the connector 22 is coupled to the first housing 121, the locking member 25 is biased by two spring member 26, 27 to a locking position as shown in FIG. 8 to engage with the locking portion 121a, and the connector 22 and the tool housing 12 are locked together.

As shown as FIGS. 1-7, the tool device 10 may further comprise an operating member 15 and an activating member 16. The operating member 15 is used to be operated by an operator to control the current of the motor, and the operating member 15 can be structured as a rotatable knob. Users can turn the knob to two opposite turning directions. When the users turns the knob to one of the two turning directions, the current of the motor 11 increases and, when the users turns the knob to the other one of the two turning directions, the current of the motor 11 decreases.

When a user uses the power tool 100 as a drill, the user can operate the operating member 15 to control the output torque of the power tool 100.

The activating member 16 is movably connected to the tool housing 12, especially, is slidably connected to the tool housing 12. The activating member 16 is capable of activating the operating member 15 at a first position and deactivating the operating member 15 at a second position.

The activating member 16 is configured to trigger a switch member 18 or not trigger the switch member 18. The switch member 18 is capable of turning on or off the operating member 15. When the activating member 16 is at the first position, the switch member 18 is triggered by the activating member 16 and activates the operating member 15 and, when the activating member 16 is at the second position, the switch member 18 is not triggered by the activating member 16 and deactivates the operating member 15.

Figure 4:
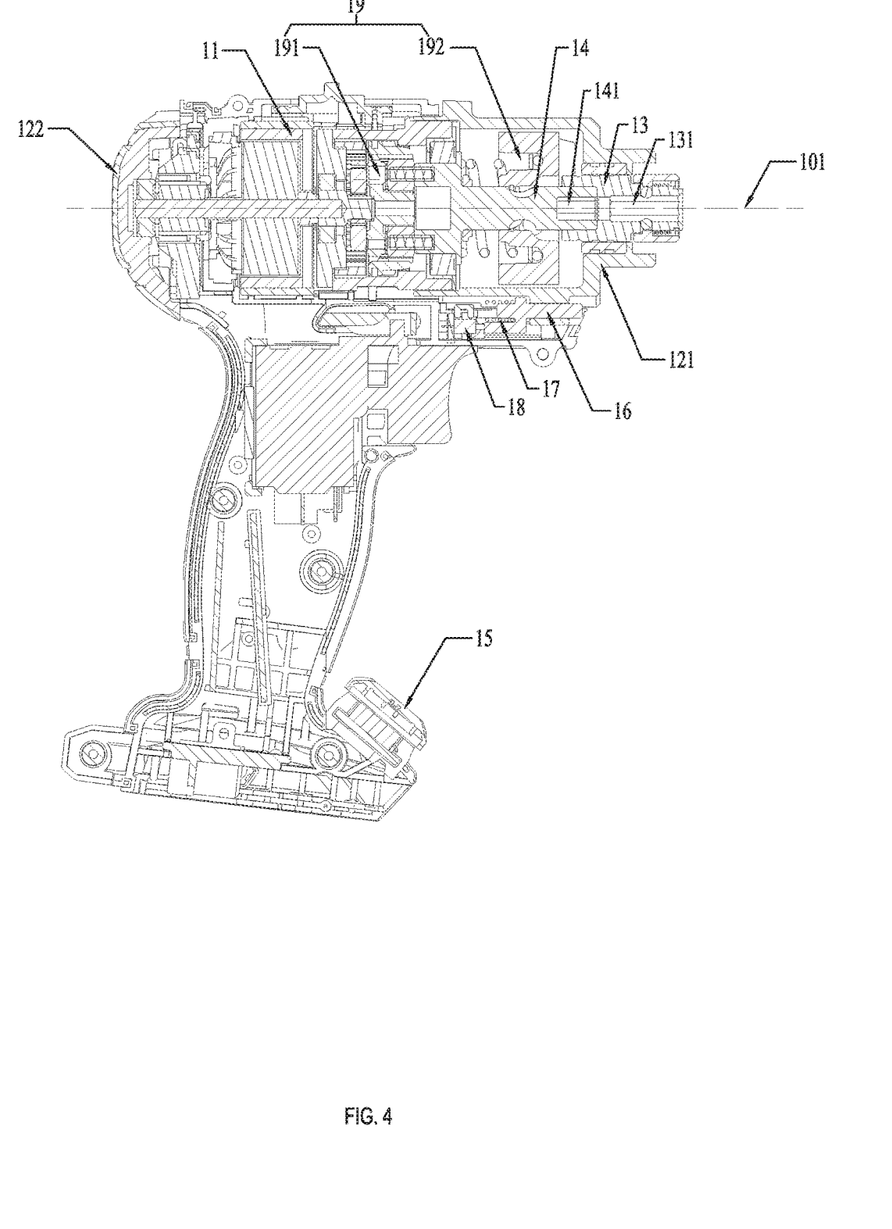
FIG. 4 is an internal schematic view of the tool device of FIG. 1.
Figure 5:
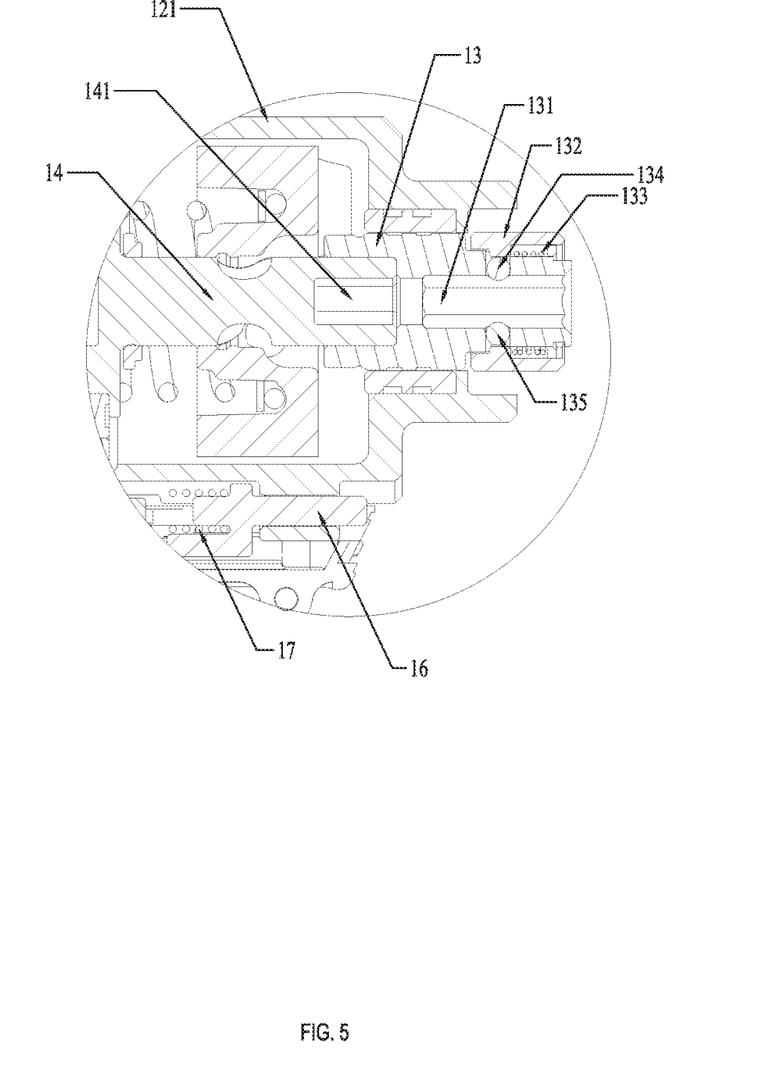
FIG. 5 is an enlarged view of a part of the tool device of FIG. 4.

As shown as FIG. 4, the activating member 16 is biased by a biasing member to the second position when the clamping device 20 is removed from the tool device 10.

For pressing the activating member 16 to the first position, the clamping device 20 may further include a pressing portion 24 which is configured to press the activating member 16. The pressing portion 24 is structured as a projection part projecting from the main body of the connector 22. Specifically, the pressing portion 24 and the connector 22 are formed by one piece, and the activating member 16 is received in the tool housing 12 for preventing the activating member 16 from being hit by accident.

Additionally, the tool device 10 may further include a transmission system 19 which is configured to enable the motor 11 to drive the driving shaft 14.

The transmission system 19 may include a planetary gear system 191 to perform a speed regulation between the motor 11 and the driving shaft 14. The transmission system 19 may further include an impacting system 192 to drive the driving shaft 14 impactively.

The above illustrates and describes basic principles, main features and advantages of the invention hereinafter claimed. Those skilled in the art should appreciate that the above embodiments do not limit the claimed invention in any form. Technical solutions obtained by equivalent substitution or equivalent variations all fall within the scope of the claimed invention.

What is claimed is:

1. A power tool for driving a screwdriver bit and a drill bit, comprising:
   a tool device including a motor, a tool housing for receiving the motor, an outputting shaft forming an insertion hole for being inserted by the screwdriver bit, and a driving shaft configured to drive the outputting shaft to rotate about a center axis and forming an insertion socket; and
   a clamping device including a clamping head configured to clamp the drill bit, a connector for detachably connecting the clamping head with the tool device, and a transmitting member configured to pass through the insertion hole and insert into the insertion socket, the transmitting member comprising:
   two opposite ends, one of the two opposite ends being fixedly connected to the clamping head and the second one of the two opposite ends configured to form a transmitting portion of the transmitting member for inserting into the insertion socket by passing through the insertion hole, an outer surface of the transmitting portion engaging with a wall of the insertion socket, so that when the driving shaft rotates, the transmitting member and the clamping head are driven to synchronously rotate with the driving shaft about the center axis so as to drive the screwdriver bit to rotate so that the driving shaft drives the clamping head to rotate, wherein the tool device further comprises an operating member for being operated by an operator to control the current of the motor and an activating member movably connected to the tool housing and operable to activate the operating member at a first position and deactivate the operating member at a second position, and wherein the clamping device further comprises a pressing portion configured to press the activating member to the first position when the clamping device is connected to the tool device.

2. The power tool of claim 1, wherein the connector is configured to slidably connect to the tool housing along a direction which is parallel to the center axis.

3. The power tool of claim 1, wherein the pressing portion and the connector are formed as one piece.

4. The power tool of claim 1, wherein the tool device further comprises a biasing member configured to bias the activating member to the second position.

5. The power tool of claim 1, wherein the tool device further comprises a switch member configured to be triggered by the activating member and enable the operating member to control the motor.

6. The power tool of claim 1, wherein the tool housing comprises a locking portion and wherein the clamping device further comprises a locking member configured to engage the locking portion so as to lock the connector and the tool housing together.

7. The power tool of claim 1, wherein the clamping device further comprises a spring member configured to bias the locking member to engage the locking portion when the connector is coupled to the tool housing.

* * * * *